US012376710B2

(12) United States Patent
De Man et al.

(10) Patent No.: US 12,376,710 B2
(45) Date of Patent: Aug. 5, 2025

(54) DOSE ADJUSTABLE DISPENSING SYSTEM AND METHODS OF USING AND ASSEMBLING THE SAME

(71) Applicant: SILGAN DISPENSING SYSTEMS CORPORATION, Richmond, VA (US)

(72) Inventors: Eelco De Man, Vlijmen (NL); Eric Rossignol, Chalon sur Saone (FR)

(73) Assignee: SILGAN DISPENSING SYSTEMS CORPORATION, Richmond, VA (US)

( * ) Notice: Subject to any disclaimer, the term of this patent is extended or adjusted under 35 U.S.C. 154(b) by 132 days.

(21) Appl. No.: 18/108,052

(22) Filed: Feb. 10, 2023

(65) Prior Publication Data

US 2024/0268608 A1 Aug. 15, 2024

(51) Int. Cl.
*A47K 5/12* (2006.01)
*B05B 11/10* (2023.01)

(52) U.S. Cl.
CPC ........ *A47K 5/1205* (2013.01); *B05B 11/1001* (2023.01)

(58) Field of Classification Search
CPC .............. A47K 5/1205; B05B 11/1001; B05B 11/1005; B05B 11/1007; B05B 11/1008; B65B 3/32; G01F 11/021; G01F 11/023
See application file for complete search history.

(56) References Cited

U.S. PATENT DOCUMENTS 3,949,906 A 4/1976 Pettersen et al.
6,334,549 B1 1/2002 Fernandez et al.
10,166,563 B2 1/2019 Espinoza
10,473,176 B2 11/2019 Deman et al.
10,493,475 B1 * 12/2019 Yang .................... B05B 11/028
2003/0116588 A1 * 6/2003 Santagiuliana ..... B05B 11/1007 222/321.9
2012/0024907 A1 2/2012 Law
2012/0267399 A1 10/2012 Moretti
2017/0197227 A1 * 7/2017 Espinoza ............. F04B 53/144

FOREIGN PATENT DOCUMENTS

CN 114394327 A * 4/2022
WO 2023057860 4/2023

* cited by examiner

*Primary Examiner* — Donnell A Long

(57) ABSTRACT

A pump engine having selectable outputs based on the positioning of two components of the pump engine may be assembled for a desired output and incorporated into a pump or pump system made of recyclable materials.

17 Claims, 6 Drawing Sheets

DOSE ADJUSTABLE DISPENSING SYSTEM AND METHODS OF USING AND ASSEMBLING THE SAME

BACKGROUND OF THE INVENTION

Field of the Invention

A pump dispensing system having standard parts which may be selectively assembled together to alter the dose delivery of the pump dispensing system or which may incorporate one or more alternate parts with the selective assembly of parts to alter the dispensing dose of an assembled pump.

Description of Related Art

Pumps and pumps systems are well known and are used in many markets to pump or deliver fluids. In the markets of personal care, cosmetics, beauty, and fragrance, pumps are used to disperse or deliver liquid and cream products from a container or bottle to a user.

The typical pump system used to deliver a cosmetic liquid, soap, or other formulation includes a container filled with a liquid product and a pump mounted to the container to draw product from the container and disperse it for use by a user. The pump may include a pump head, a pump engine, and a closure or connection component used to connect the pump to the container. In many instances, a pump will include an accumulator having a valve adjacent one end with a piston mounted within an interior space of the accumulator. The space between the valve and the piston defines a pump chamber into which the product is drawn from the container through the valve. The piston is typically connected to a piston stem having a product flow path on an internal portion of the piston stem. The piston stem is connected to a pump head having a product flow path in communication with the piston stem product flow path and an orifice or dispensing opening through which product can flow to a user. Movement of the pump head moves the piston stem which unseats the piston stem from the piston, exposing an inlet opening into the piston stem product flow path to the pump chamber. Once the piston is unseated from the inlet opening, the piston moves within the pump chamber, forcing product in the pump chamber through the inlet opening and through the pump. Typically, a spring associated with the piston stem or other portion of the pump, returns the piston stem to the at-rest position following actuation of the pump.

Use of pumps is well known and there are many different variations, configurations, and sizes of pump available on the market. One issue with existing pump systems, however, is that pumps of a similar design may not be available in different sizes to fit on different container sizes. In addition, the dispensing dosage of a particular pump design may not be available in multiple quantities. For example, a brand owner promoting a product in a small package having a dose X and in a large package having a dose Y may not be able to source a pump having the same design for both the X dosage and the Y dosage. The brand owner is often forced in such cases to source two different pumps and the operation, feel, and user experience with the different pumps may not be the same do to the different design of the pumps. This can be undesirable, especially when the brand owner wants to have a similar experience across the entire brand.

In addition, the costs associated with providing a product in multiple sized pumps can be prohibitive. Because pumps and pump systems for different dosage amounts are often of different designs, the costs to commercialize in two or more dosages are at least twice as much as commercializing in one size because molding equipment, assembly machines, and tools for each size must be purchased and operated. There have been some attempts to reduce the need for fully re-tooling to provide alternate dosage sizes using similar or standard parts. For example, U.S. Pat. No. 10,166,563, discloses a pump system in which an output cylinder may be changed during assembly to control the potential dosage capable of being pumped or delivered by a pump while using other common parts in such a way that costs can be reduced, or components can be shared, for pumps and pump systems having different dosages.

While attempts have been made to reduce costs associated with the production of pumps and pump systems using similar parts, and pumps and pump systems have been developed to attempt to mirror a user experience for pumps having different dosage amounts, improvements are still necessary and reduced costs associated with the manufacturing of such pumps is desired.

BRIEF SUMMARY OF THE INVENTION

Various embodiments of the present invention relate to pump systems that may be recycled in a single recycling stream and which may be assembled utilizing a pump engine that may be assembled to a targeted output or dosage based upon the arrangement of the components of the pump engine. According to embodiments of the invention, the configuration of pump engine components to allow for multiple dosages based on the assembly configuration decreases the number of parts required to manufacture pump engines having different dosages or outputs, thereby reducing manufacturing and assembly costs.

A pump engine according to various embodiments of the invention may include an accumulator, an inlet valve, a piston stem, a piston stop, a piston, a spring and a lower cone. The inlet valve may be seated in the accumulator and may include a ball valve, a spider valve, or any other valve suitable for providing an inlet into the accumulator through which product may flow. The piston stem may be assembled to the piston stop and a flow channel may be defined therethrough. A piston connected to the piston stop may move relative to the piston stop such that an opening in the piston stop may be exposed to an interior of the accumulator, allowing product in the accumulator to pass through the opening into the flow channel during operation of a pump utilizing the pump engine. The piston stem, piston stop, and piston, may be assembled with a lower cone and the lower cone may be fixed to the accumulator. The piston stem may move relative to the lower cone during actuation of the pump engine. A spring seated between the piston stem and the lower cone applies a spring force against the piston stem and the lower cone, which force allows the pump engine to return to a non-actuated state following actuation or the application of a force by a user of the pump engine or a pump incorporating the pump engine.

According to various embodiments of the invention, the piston stem includes one or more stem flanges. In addition, the lower cone includes one or more lower cone channels into which the stem flanges may seat in an assembled state. The lower cone channels may have varying lengths such that movement of the piston stem relative to the lower cone can be varied based on the matching or seating of the stem flange in a corresponding lower cone channel. For example, a lower cone having a first lower cone channel with a length of X and a second lower cone channel with a longer length of Y provides two options for stroke length of the piston stem relative to the lower cone. When the stem flange is seated in the first lower cone channel, the stroke length—or the stroke space between the bottom of the stem flange and bottom of the lower cone channel—is smaller than if the stem flange is seated in the second lower cone channel. Thus, the stroke length of the stem can be varied by assembling the piston stem relative to the lower cone. The option to create different stroke lengths for a pump based on orientation of two parts—rather that using different sized parts for multiple sized pumps—helps reduce the number of parts that need to be made to offer alternative dosages or outputs of a pump engine.

For instance, in some embodiments of the invention, a single lower cone and piston stem may be molded and combined with one of two accumulators and pistons to offer four different outputs or dosages from the pump engines assembled. A small accumulator and piston may be assembled with a piston stem and lower cone in a first position to provide a first dosage or output. Rotation of the piston stem relative to the lower cone such that the stem flange seats in a shorter lower cone channel allows the dosage or stroke of the pump engine to be reduced, allowing for assembly of two different pump outputs from the same parts. Further, addition of a second accumulator and piston allows for two additional dosages to be created from the same piston stem and lower cone assembly. Thus, pump engines utilizing the piston stem and lower cone assemblies of the present invention allow for different outputs with fewer parts.

The pump engines according to embodiments of the invention may be assembled with a closure and dispenser head to create a pump that may be used on a filling line to create a pump system including a container, a product, and the pump. Depending on the desired output or dosage of the pump system, a pump engine may be selected or manufactured according to embodiments of the invention.

BRIEF DESCRIPTION OF THE SEVERAL VIEWS OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

Figure 1:
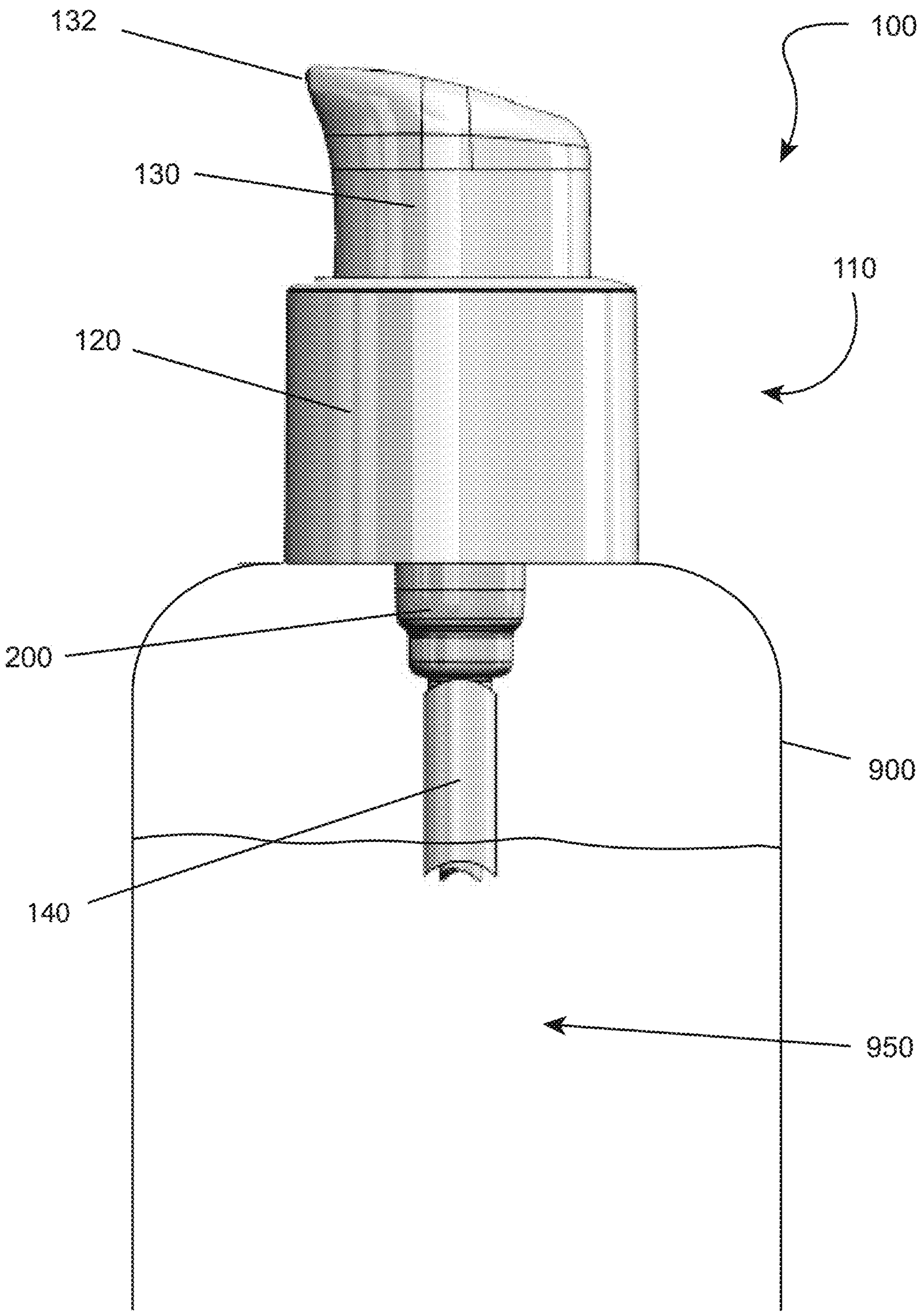
FIG. 1 illustrates a pump system according to various embodiments of the invention.

A pump system 100 according to various embodiments of the invention is illustrated in FIG. 1. As illustrated, a pump system 100 may include a pump 110 attached to a container 900. A product 950 may be included in the container 900 and may be dispensed by the pump 110 to a user. In some embodiments, the pump system 100 may include an atmospheric pump 110 utilizing a dip tube and in other embodiments the pump system 100 may be part of an airless pump system in which an airless pump 110 is utilized and the container 900 may include an airless bag system, a follower-piston system, or other airless system commonly used with airless pumps.

A pump 110 according to certain embodiments of the invention includes a closure 120, a pump engine 200, and a dispensing head 130. The pump engine 200 may be attached to or otherwise supported by the closure 120 which is attached to the container 900. The closure 120 may include any type of closure system that can be used to attach a closure 120 to the container 900. For example, a threaded closure, a bayonet closure, a snap-fit closure system, or other known closure system may be utilized with embodiments of the invention. The dispensing head 130 may be attached to or in communication with the pump engine 200. The dispensing head 130 includes a product flow path through which product pumped by the pump engine 200 flows. Upon actuation or movement of the dispensing head 130, the pump engine 200 is actuated, resulting in the pumping of a product 950 from the container 900, through the pump engine 200, and into the dispensing head 130, where it is dispensed through a dispensing opening 132 or orifice in the dispensing head 130. In some embodiments of the invention, especially when the product 950 is a fluid desired to be sprayed, an orifice cup (not shown) may be seated in the dispensing opening 132 to create a product 950 spray exiting the dispensing head 130.

Figure 2:
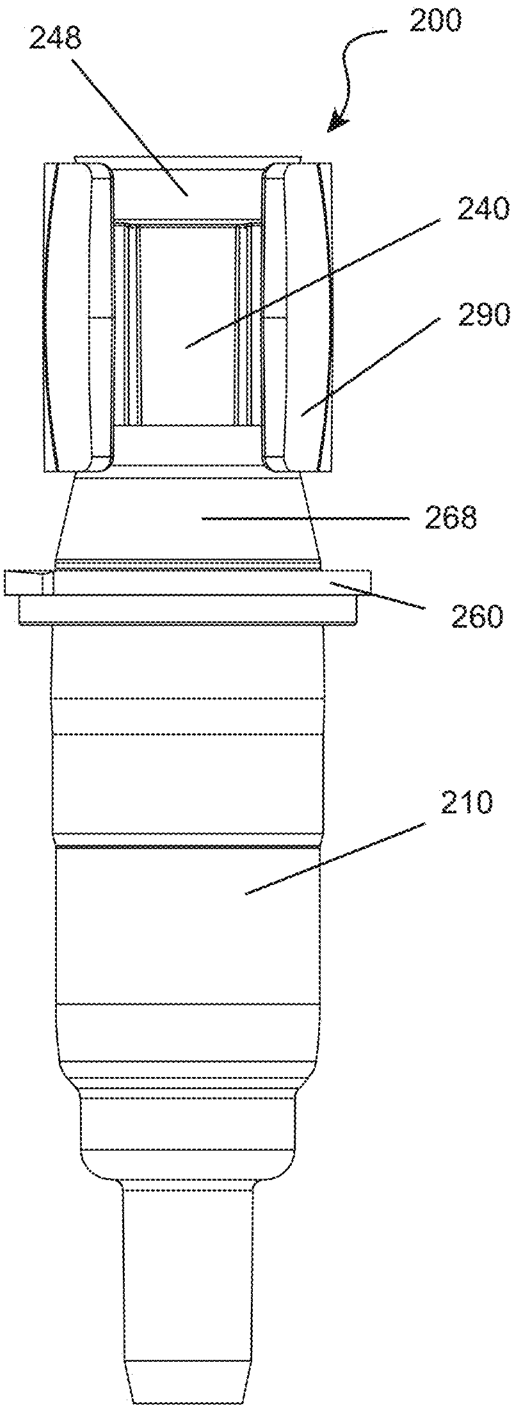
FIG. 2 illustrates parts of a pump engine according to various embodiments of the invention in a non-actuated state.
Figure 3:
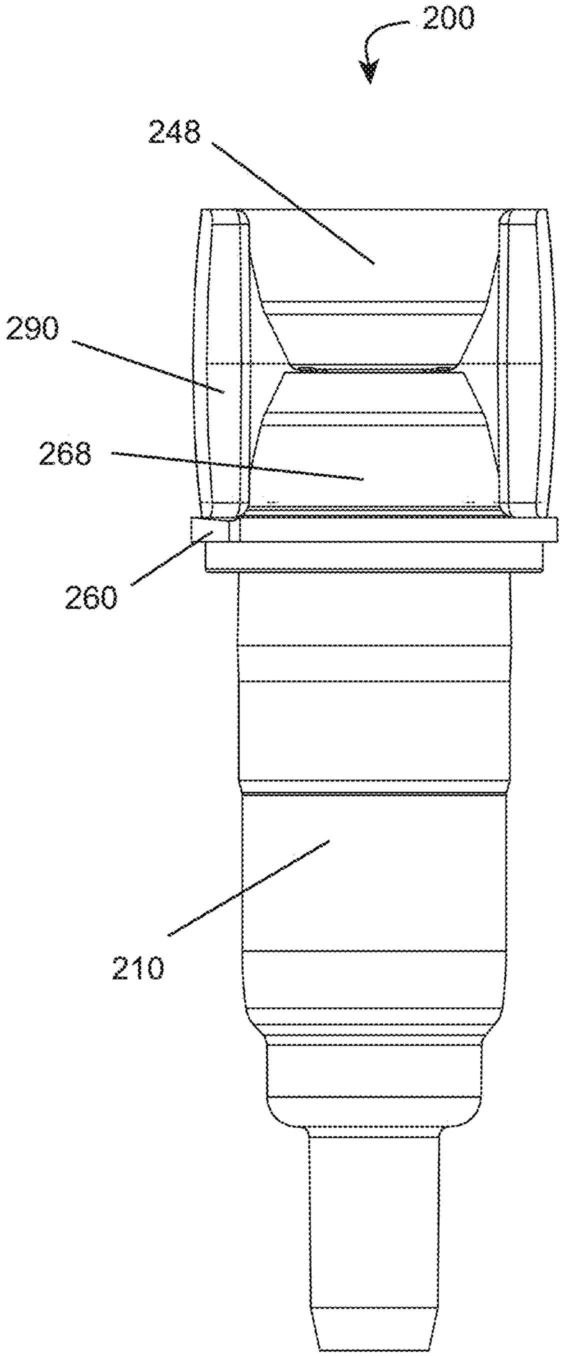
FIG. 3 illustrates the pump engine of FIG. 2 in an actuation state.
Figure 4:
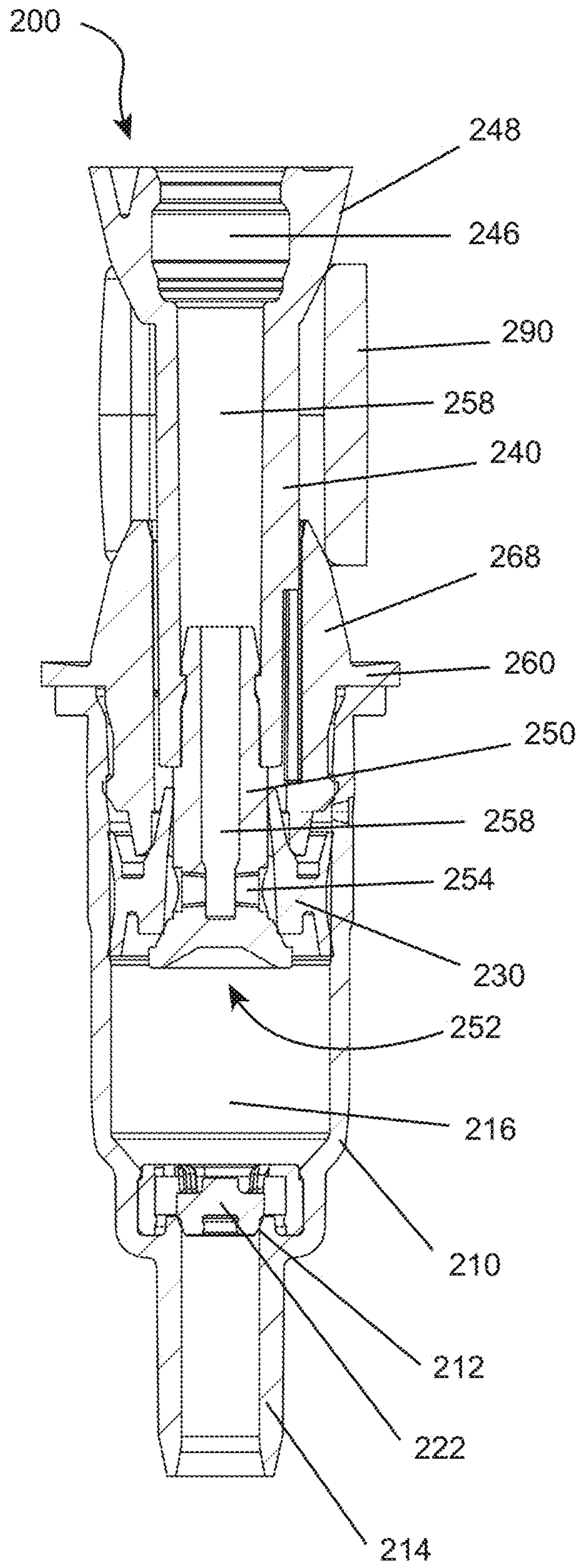
FIG. 4 illustrates a cross-sectional view of the pump engine illustrated in FIG. 2 in a non-actuated state.
Figure 5:
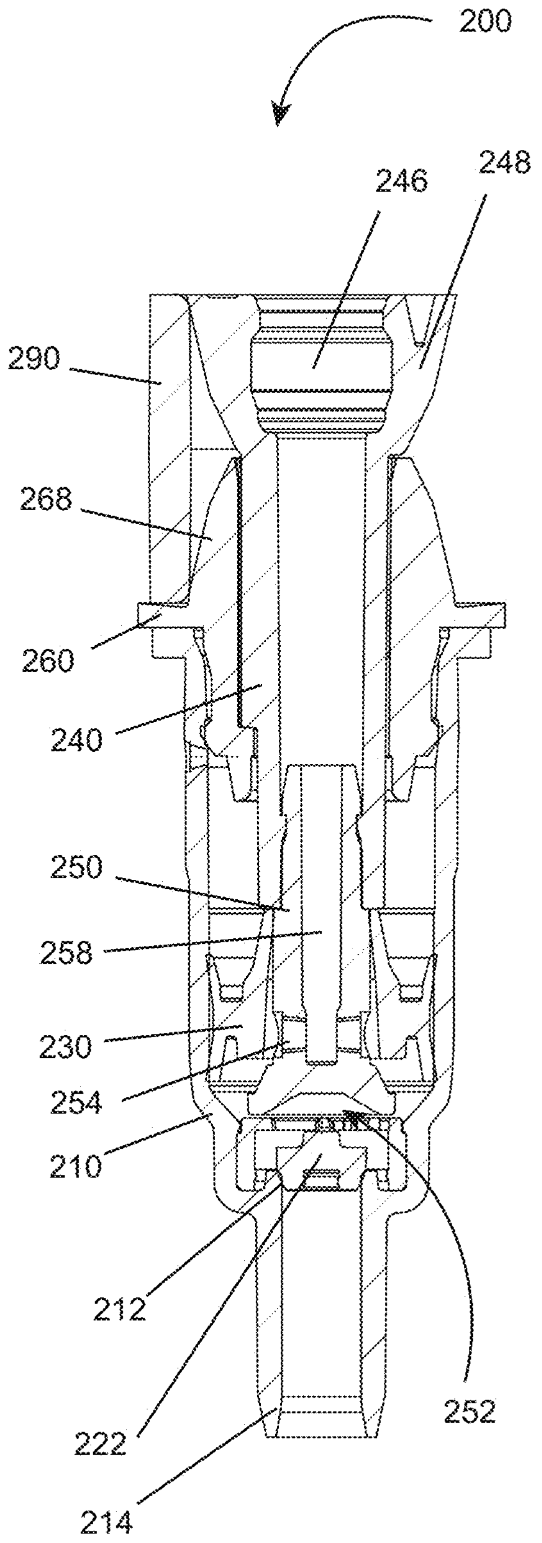
FIG. 5 illustrates a cross-sectional view of the pump engine illustrated in FIG. 2 in an actuation state.

An exterior view of components of a pump engine 200 in a non-actuated state according to embodiments of the invention is illustrated in FIG. 2. The same components of the pump engine 200 in an actuation state are illustrated in FIG. 3. A cross-sectional view of that pump engine 200 in the non-actuated state is illustrated in FIG. 4 and a cross-sectional view of that pump engine 200 in an actuation state is illustrated in FIG. 5. According to various embodiments of the invention, a pump engine 200 includes an accumulator 210, an accumulator inlet valve, a piston stem 240, a piston stop 250, a piston 230, a lower cone 260 and a spring 290.

As shown in FIG. 2, the components of the pump engine 200 may be assembled to form a pump engine 200 which may be assembled and shipped to a location to be assembled with the other components of a dispensing system 100 as desired. In other instances, a pump engine 200 may be assembled and then fed to an adjacent assembly line where it can be fitted with a closure 120, a dispensing head 130, and a dip tube 140 (or any combination thereof) to form a pump 110 for a dispensing system 100.

As illustrated in FIG. 4, the accumulator 210 includes a valve seat 212 in which an accumulator inlet valve is seated. The accumulator inlet valve may be a spider valve 222 as illustrated in FIG. 4. In other embodiments, other valves or valve systems can be used with pump engines 200 of the invention. For example, a ball valve could be substituted for the spider valve 222.

An accumulator 210 includes walls defining an internal space within the accumulator 210. A piston 230 may be moveably seated within that interior space opposite or away from the valve seat 212 as illustrated. The space between the inlet valve and the piston 230 defines a pump chamber 216.

In some embodiments used with atmospheric pump engines 200, a dip tube connection 214 may extend from a portion of the accumulator 210 adjacent the valve seat 212 away from the pump chamber 216 as illustrated in FIGS. 4 and 5. In other embodiments, for example, with an airless system, a dip tube connection 214 may not be included as part of the accumulator 210. When included as a part of an accumulator 210, a dip tube connection 214 includes an inner diameter and an outer diameter. In some embodiments of the invention, a dip tube 140 may fit over the dip tube connection 214 such that an inner wall of the dip tube 140 mates with or connects to the outer wall of the dip tube connection 214. In other embodiments, a dip tube 140 may be seated such that the outer wall of the dip tube 140 is seated against an interior wall of the dip tube connection 214. This may be the case in which smaller, non-standard dip tubes 140 are used with pump systems 100 of the present invention. The configuration of the dip tube connection 214 is such that the pump engines 200 according to embodiments of the invention may be used with different sized dip tubes 140.

The piston 230 seated in the accumulator 210 is connected to the piston stop 250 which in turn is connected to the piston stem 240. The piston stop 250 includes an inlet end 252 having one or more inlet openings 254 adjacent the inlet end 252. The one or more inlet openings 254 are in communication with a piston product flow path 258 extending through an interior of the piston stop 250 and an interior of the piston stem 240. As illustrated in FIG. 4, an end of the piston stop 250 opposite the inlet end 252 may be seated within the interior of the piston stem 240. One or more connection features, such as snap-connections, friction-fit connections, beads, flanges, or other features, may be used to retain the piston stop 250 connection to the piston stem 240. While the illustrated embodiment shows the piston stop 250 inserted in an internal portion of the piston stem 240, the opposite could also be configured with embodiments of the invention so that the piston stem 240 is in an internal portion of the piston stop 250 and connected thereto.

The piston 230 is moveably seated on the piston stop 250 adjacent the inlet end 252. In a non-actuated state, or rest state in which the pump 110 is not being actuated as illustrated in FIG. 4, the piston 230 covers and seals the one or more inlet openings 254 in the piston stop 250, preventing the passage of any product in the pump chamber 216 through the one or more inlet openings 254 and into the piston product flow path 258. Upon movement of the piston stop 250, caused by actuation of the pump 110, the piston 230 initially remains seated in the accumulator 210 and begins moving when the piston stem 240 engages an upper flange or other portion of the piston 230, moving the piston 230 within the pump chamber 216. Movement of the piston 230 within the pump chamber 216 applies a force to any air or product 950 in the pump chamber 216. The delay in the movement of the piston 230 relative to the piston stop 250 creates a space between the inlet end 252 of the piston stop 250 and the piston 230 which allows the passage of product 950 in the pump chamber 216 into the one or more inlet openings 254 in the piston stem 250.

FIG. 5 shows a cross-sectional view of the pump engine 200 of FIG. 3 in an actuation state. As illustrated, a gap between the piston 230 and the inlet end 252 of the piston stop 250 allows product 950 in the pump chamber 216 to be pushed out of the pump chamber 216 and through the one or more inlet openings 254 into the piston product flow path 258. Upon cessation of the actuation of the pump 110, the piston stop 250 is moved in an opposite direction in which it again seats against the piston 230 and returns the piston 230 and piston stop 250 to the non-actuated state and the piston stop 250 pulls or moves the piston 230 back through the pump chamber 216 to the at-rest position illustrated in FIG. 4. Movement of the piston 230 in the opposite direction through the pump chamber 216 creates a vacuum which in turn acts on the spider valve 222—or other valve seated in the valve seat 212—opening the spider valve 222 to allow product 950 from within a container 900 connected to the pump 110 to flow into the pump chamber 216.

A piston stem 240 according to various embodiments of the invention has a first piston stem end connected to the piston stop 250. The second, or opposite end, of the piston stem 240 includes a dispensing head connection 246 and a first spring cone 248. The piston product flow path 258 extends through the piston stem 240 from the first piston stem end connected to the piston stop 250 through the dispensing head connection 246.

According to some embodiments, the dispensing head connection 246 may include a hollow or opening in the piston stem 240 which is in communication with the piston product flow path 258. A dispensing head 130 may include a piston stem connection 136 configured to seat in the dispensing head connection 246 such that a product flow path through the dispensing head 130 is in communication with the piston product flow path 258. Connection features, such as snap beads, friction connections, threads, bayonet connections, or other connection systems may be incorporated into the dispensing head connection 246 and piston stem connection 136 to facilitate the joining and assembly of a dispensing head 130 to the piston stem 240.

In operation, actuation of the dispensing head 130 translates a force against the piston stem 240 which in turn moves the piston stem 240 towards the piston stop 250 and moves the piston stop 250 to begin actuation of the pump engine 200. As an actuation force is applied to the piston stem 250, the first spring cone 248 acts against a spring 290 and a surface of the spring 290 may slide along a portion of the surface of the first spring cone 248. The spring 290 moves into a position such as that shown in FIG. 5 during actuation of the pump engine 200. Upon the release of a force against the dispensing head 130 and piston stem 240, the spring 290 may apply a force to the first spring cone 248, moving the piston stem 240 back towards the non-actuated state illustrated in FIG. 4.

The end of the spring 290 opposite the end interacting with the first spring cone 248 interacts with the second spring cone 268 that is part of the lower cone 260 as illustrated in FIGS. 4 and 5. A lower cone 260 according to various embodiments of the invention is seated in an opening in the accumulator 210. The lower cone 260 includes central channel 262 in which the piston stem 240 and piston stop 250 are positioned in a non-actuated state. In addition, part of a piston 230 may extend into the central channel 262 of the lower cone 260 in a non-actuated state as illustrated in FIG. 4. The central channel 262 of the lower cone 260 guides the movement of the piston stem 240 during actuation of the pump engine 200.

The lower cone 260 also includes the second spring cone 268 configured to work in conjunction with the first spring cone 248 and the spring 290 to provide a spring force against the piston stem 240 following actuation of the pump engine 200 such that the spring force will return the piston stem 240, and the pump engine 200, to a non-actuated state. As illustrated in FIG. 4, a spring 290 is positioned between the first spring cone 248 of the piston stem 240 and the second spring cone 268 of the lower cone 260. As the pump engine 200 is actuated—for example by a force exerted on the dispensing head 130 which is translated to the piston stem 240—the distance between the first spring cone 248 and second spring cone 268 is reduced, moving the spring 290 outwards along the surface of the first spring cone 248 and second spring cone 268. This movement creates a spring force in the spring 290 which seeks to return the first spring cone 248 back to the non-actuated position. Upon a release of the actuation force, the spring 290 pushes the piston stem 240 back to the non-actuated position illustrated in FIG. 4.

A spring 290 according to some embodiments of the invention may include a plastic or resin compression spring or c-shaped spring. For example, the spring 290 and configuration of the first spring cone 248 and second spring cone 268 such as that described in U.S. Pat. No. 10,473,176 can be used with embodiments of the invention. When seated between the first spring cone 248 and second spring cone 268 and subjected to a force caused by movement of the piston stem 240, such a spring 290 expands, increasing the diameter of the compression spring openings resulting in movement along the edge of the first spring cone 248 and the second spring cone 268. Release of the force allows the spring 290 to return to its original state and it compresses, reducing the diameter of the compression spring openings, forcing the piston stem 240 to move away from the lower cone 260.

In other embodiments of the invention, the spring 290 may include a coil spring, metal compression spring, or other spring configuration capable of returning the piston stem 240 to a non-actuated state after the pump engine 200 has been actuated.

According to various embodiments of the invention, a pump engine 200 may be customized for a desired output by selectively assembling the pump engine 200 parts in particular configurations. In particular, the assembly of the piston stem 240 and the lower cone 260 within the pump engine 200 may control or define the output of the pump engine 200. In other embodiments, the assembly of the piston stem 240 relative to the lower cone 260 and the selection of different sized accumulators 210 and pistons 230 may alter the output of the pump engine 200.

According to some embodiments of the invention, different pump engine 200 output quantities may be created by altering the position of the piston stem 240 relative to the lower cone 260 during assembly and selecting desired accumulators 210 and pistons 230. For example, four different output sizes may be generated: pump engine 200 output sizes of 250 μl, 150 μl, 100 μl, and 80 μl may be offered as an option. As illustrated in FIGS. 6 through 9, the accumulators 210 used to create the four pump engine 200 options described herein include three different accumulators—210A, 210B, and 210C—which may selected based on the desired output option. In addition, one of two pistons—230A and 230B—may be selected based on the desired output.

Figure 6:
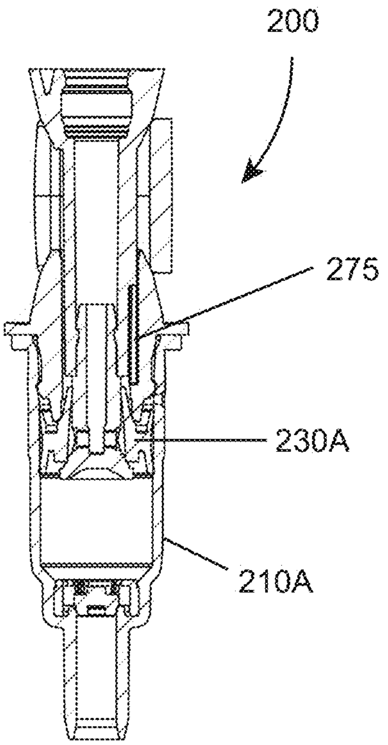
FIG. 6 illustrates a cross-sectional view of a pump engine according to various embodiments of the invention.

FIG. 6 illustrates a cross-sectional view of a pump engine 200 configured for a 250 μl output. Accumulator 210A is configured for production of a 250 μl output when combined with piston 230A and the other components of the pump engine 200.

Figure 7:
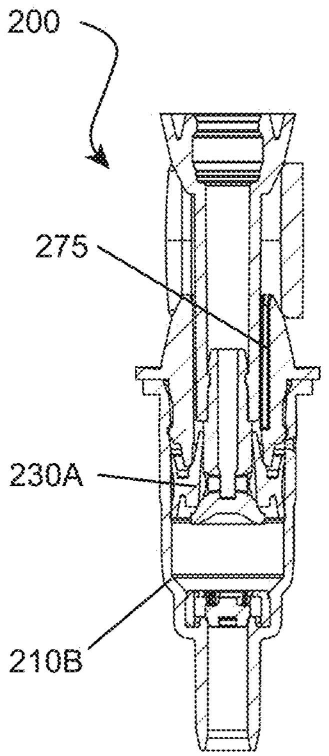
FIG. 7 illustrates a cross-sectional view of a pump engine according to various embodiments of the invention.

FIG. 7 illustrates a cross-sectional view of a pump engine 200 configured for a 150 μl output. Accumulator 210B is configured for production of a 150 μl output when combined with piston 230A and the other components of the pump engine 200.

Figure 8:
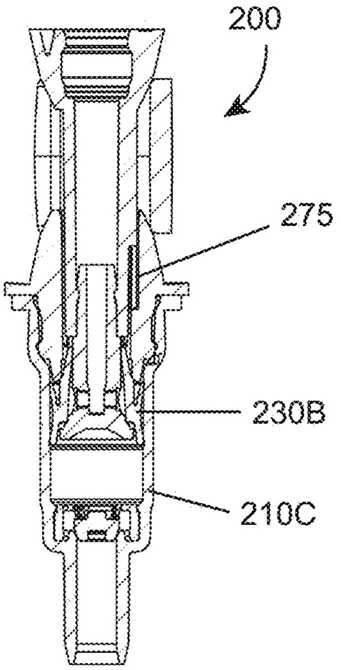
FIG. 8 illustrates a cross-sectional view of a pump engine according to various embodiments of the invention.
Figure 9:
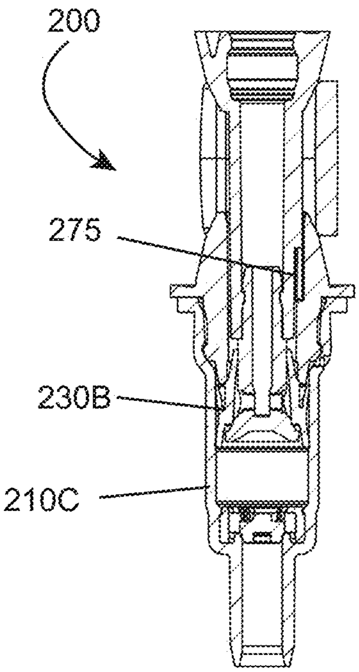
FIG. 9 illustrates a cross-sectional view of a pump engine according to various embodiments of the invention.

FIG. 8 illustrates a cross-sectional view of a pump engine 200 configured for a 100 μl output and FIG. 9 illustrates a cross-section view of a pump engine 200 configured for an 80 μl output. The accumulator 210C used for the 100 μl output pump engine 200 and the 80 μl pump engine 200 is the same accumulator 210C. In addition, the piston 230B is the same size. As illustrated, however, a stroke space 275 created by the positioning of the piston stem 240 in the lower cone 260 is different between the 100 μl output pump engine 200 and the 80 μl pump engine 200 as shown in FIGS. 8 and 9.

As illustrated in FIGS. 6 through 9, the pump chambers 216 of each pump engine 200 are a different size. The size of the pump chambers 216 is controlled in part by the size of the accumulator 210A, 210B, or 210C and the included piston 230A or 230B. In addition, the stroke length of the pump 110 incorporating the pump engine 200 is dependent on the stroke space 275 defined between the piston stem 240 and the lower cone 260. This is easy to see in FIGS. 8 and 9. The pump engines 200 illustrated in FIGS. 8 and 9 include the same sized accumulator 210C and the same sized piston 230B. The assembly of the pump engine 200 also creates the same sized pump chamber 216. However, as shown, the positioning of the piston stem 240 relative to the lower cone 260 in the pump engine 200 illustrated in FIG. 8 is different than that of the positioning illustrated in FIG. 9. As a result, the stroke space 275 is smaller in the pump engine 200 illustrated in FIG. 9. The smaller—or shorter—stroke space 275 limits the travel of the piston stem 240 and piston 230B such that the piston 230B travels through more of the pump chamber 216 when the pump engine 200 of FIG. 8 is actuated as compared to the pump engine 200 of FIG. 9. That increased stroke length accounts for an additional 20 μl of output by the pump engine 200 illustrated in FIG. 8 as compared to that illustrated in FIG. 9.

In addition to the selection of an accumulator 210 and piston 230 to create a desired pump chamber 216 size for the output of pump engine 200, the piston stem 240 and lower cone 260 may be customized with one or more stem flanges 249 and one or more lower cone channels 269 allowing the selective output of a pump engine 200 based on the alignment and assembly of the piston stem 240 with the lower cone 260.

Figure 10:
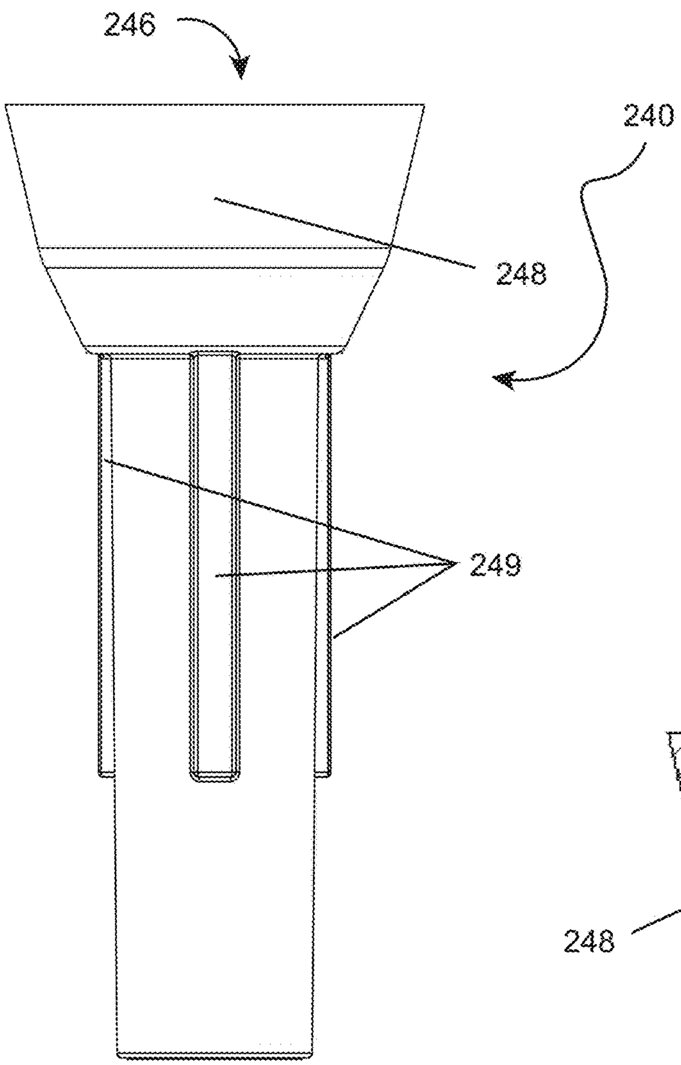
FIG. 10 illustrates a piston stem according to various embodiments of the invention.
Figure 11:
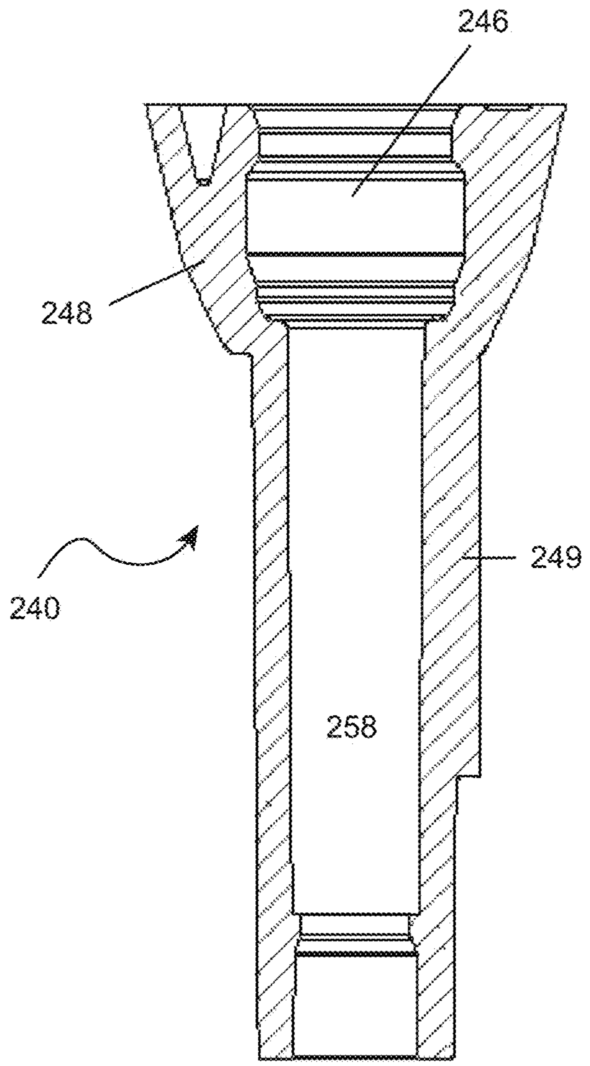
FIG. 11 illustrates a cross-sectional view of a piston stem according to various embodiments of the invention.

For example, a piston stem 240 according to various embodiments of the invention is illustrated in FIGS. 10 and 11. A corresponding lower cone 260 according to various embodiments of the invention is illustrated in FIGS. 12 to 13.

A piston stem 240 may include one or more stem flanges 249 projecting off an exterior surface of the piston stem 240 as illustrated. A stem flange 249 may include a small projection or a larger projection. As illustrated in FIG. 10, multiple stem flanges 249 extend along an exterior surface of the piston stem 240 from a bottom portion of the first spring cone 248 down the length of the piston stem 240 towards the connection with the piston stop 250. A stem flange 249 may be configured with a desired length such that when coupled with a lower cone channel 269 a desired stroke space 275 and stroke length is achieved. In some embodiments of the invention, multiple stem flanges 249 may be provided and those stem flanges 249 may be the same length. In other embodiments having multiple stem flanges 249, the stem flanges 249 may vary in length such that the orientation of the piston stem 240 with the lower cone 260 can be used to align the desired stem flange 249 with a lower cone channel 269 to define a stroke space 275. In still other embodiments, a single stem flange 249 may be provided.

A cross-sectional view of a piston stem 240 according to certain embodiments of the invention is illustrated in FIG. 11.

Figure 12:
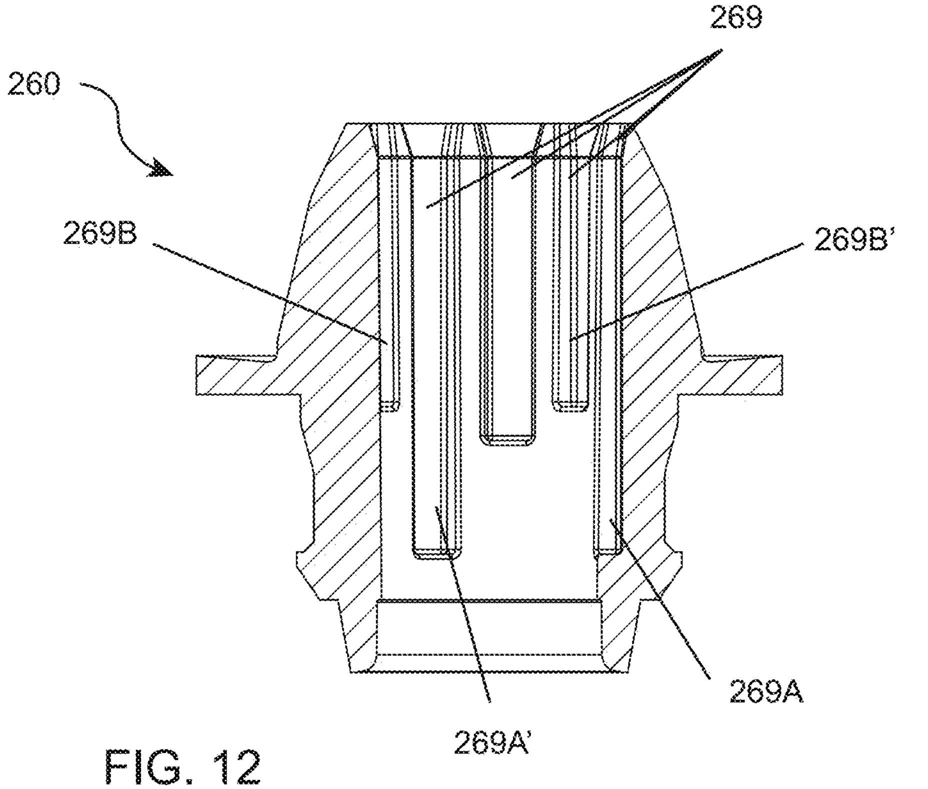
FIG. 12 illustrates a cross-sectional view of a lower cone according to various embodiments of the invention.
Figure 13:
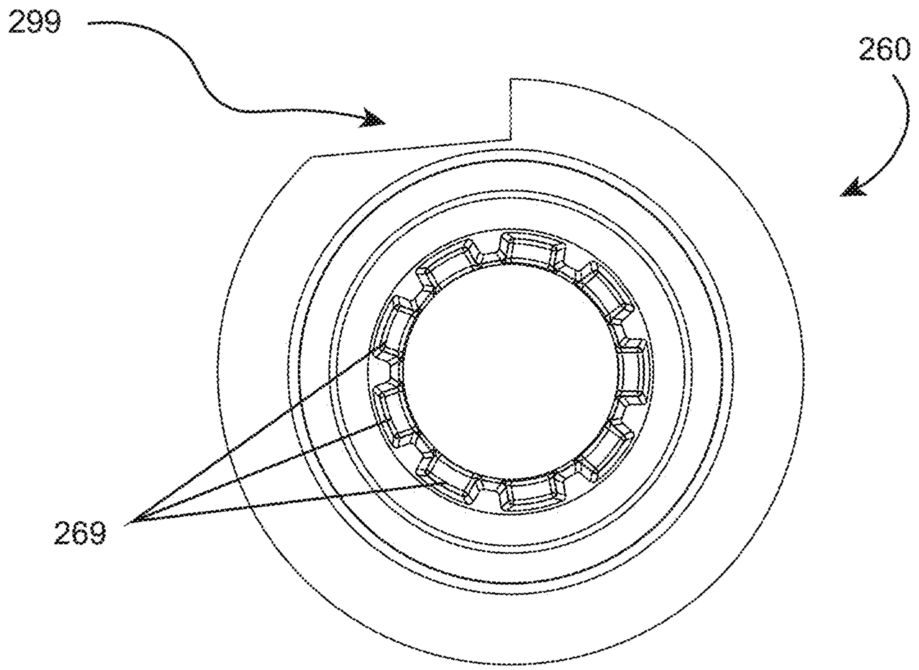
FIG. 13 illustrates a top-down view of a lower cone according to various embodiments of the invention.

A lower cone 260 according to various embodiments of the invention is illustrated in FIGS. 12 and 13. A cross-sectional view of a lower cone 260 according to embodiments of the invention is illustrated in FIG. 12. As illustrated, the lower cone 260 includes one or more lower cone channels 269 located on an interior surface of the lower cone 260. The lower cone channels 269 have different lengths or depths into the interior of the lower cone 260 and each of the lower cone channels 260 may be configured to receive a stem flange 249 therein. In some embodiments, there may be multiple lower cone channels 269 having a similar or the same depth. When the lower cone 260 is assembled with a piston stem 240, a stem flange 249 fits into or sits in one of the lower cone channels 269. The stroke space 275 between a bottom of the lower cone channel 269 and the stem flange 249 positioned in the lower cone channel 269 dictates the maximum stroke length for the pump engine 200. As the pump engine 200 is actuated, the stem flange 249 travels along the lower cone channel 269 until it reaches the bottom of the lower cone channel 269 at which point further movement of the piston stem 240 is blocked or stopped. Thus, the stroke length of the pump engine 200 is reached and no further actuation is possible.

As illustrated in FIG. 12, there may be multiple lower cone channels 269 having the same length. For example, lower cone channels 269A and 269A' shown in the cross-sectional view of FIG. 12 have the same length. Likewise, lower cone channels 269B and 269B' have the same length. A piston stem 240 having multiple stem flanges 249 of the same length may therefore be seated in the lower cone 260 such that the stem flanges 249 align, fit, or are seated in the lower cone channels 269 having a desired size to regulate the stroke length or create the desired stroke space 275. The use of multiple stem flanges 249 with multiple lower cone channels 269 can assist in stabilizing the movement of the piston stem.

According to various embodiments of the invention, the lower cone 260 may include multiple lower cone channels 269, each having a length. The length of the lower cone channels 269 may be varied such that the stroke space 275 and stroke length of a pump engine 200 may be altered or selected by aligning the piston stem 240 relative to the lower cone 260 such that the stem flange 249 is seated in the lower cone channel 269 that will provide the desired stroke length for the desired output of the pump engine 200. As illustrated in FIG. 12, the lower cone channels 269 may be of different length and multiple channels having the same length may be used. For example, the top-down view of the lower cone 260 illustrated in FIG. 13 shows nine different lower cone channels 269. This view is a top-down view of the lower cone 260 illustrated in FIG. 12. The nine lower cone channels 269 may include lower cone channels 269 having three different lengths: a first length, a second length, and a third length. Each of the three length lower cone channels 269 may be positioned so that the lower cone channels 269 having the same length are about 120 degrees from each other on center. In this way, a piston stem 240 having three stem flanges 249 as illustrated in FIG. 10 may be oriented such that the three stem flanges 249 of the piston stem 240 will align with and be seated in or positioned in lower cone channels 269 having the same length. Orientation of the piston stem 240 relative to the lower cone 260 and insertion into the lower cone channel 269 will determine the stroke length and the stroke space 275 available for the pump engine 200. As illustrated in FIG. 13, a lower cone 260 may include an orientation notch 299 to help facilitate the orientation of a lower cone 260 relative to the piston stem 240 during assembly. In other embodiments, other orientation features may be incorporated with the lower cone 260 or with the piston stem 240 or both to help facilitate assembly of a pump engine 200.

While certain embodiments of the invention described and illustrated herein show a piston stem 240 having a stem flange 249 configured to mate with or travel within a lower cone channel 269, it is understood that the opposite could also be used with embodiments of the invention. For instance, a piston stem 240 may include one or more channels and the lower cone 260 could include a flange extending off an internal surface thereof configured to mate with the one or more stem channels to define a stroke space 275 giving the desired stroke length for a pump engine 200.

During assembly of a pump engine 200 of the present invention, a piston stem 240 may be rotated or aligned with the lower cone 260 before assembly therewith based on the desired stroke length and stroke space 275 size. Alternatively, the piston stem 240 may be fixed during assembly and the lower cone 260 rotated or aligned as desired to allow the stem flange 249 to align with the desired lower cone channel 269 for the given pump engine 200 output desired. Once aligned, the piston stem 240 and lower cone 260 may be assembled with a spring 290 positioned therebetween.

While various pump engine 200 outputs are described with reference to FIGS. 6 through 9, it is understood that embodiments of the invention are not limited to the outputs described. According to embodiments of the invention, a pump 110 or dispensing system 100 may incorporate a pump engine 200 having a piston stem 240 and lower cone 260 configured such that the output of the pump engine 200 may be tailored or customized based on the positioning of the stem 240 relative to the lower cone 260. Alternatively, the positioning of the piston stem 240 relative the to lower cone 260 and the selection of an accumulator 210 and piston 230 for a desired output may be undertaken to assemble a pump engine 200 having a desired output and that pump engine 200 may be assembled as a part of a pump 110 and the pump 110 assembled as part of a dispensing system 100.

According to embodiments of the invention, pump engines 200 may be molded or configured in such a manner that they are capable of being assembled with closures 130 having different closure sizes. The accumulators 210 used with the pump engines 200 of various embodiments of the invention may include sizes that can be used with multiple closures 130. In this manner, a pump engine 200—or a series of pump engines 200 having different output sizes—may be assembled and fit with closures 130 of different sizes such that the pumps 100 may be attached to different sized bottles or containers 900. The ability to easily mix-and-match pump engine 200 outputs with different closure 130 sizes provides brand owners options to maintain the look, feel, and performance of a brand or product across different sizes and output requirements. In addition, the options are presented at a reduced cost as compared to existing options because parts of the pump engines 200 may be used with multiple different sizes and output specifications, reducing the need for all custom parts for each pump having a different output and/or a different closure 130 size.

According to other embodiments of the invention, pump engines 200 or pumps 110 having different outputs may be manufactured and assembled utilizing the pump engine 200 components of the present invention. For instance, according to some embodiments of the invention, a pump engine 200 having a selected output may be manufactured in the following manner. One or more molding processes are used to mold a set of accumulators 210 having different sizes configured for a desired series of outputs when assembled with a piston stem 240 and lower cone 260 of the present invention. One or more molding processes are used to mold a set of pistons 230 having different sizes configured for a desired series of outputs when assembled with a piston stem 240 and lower cone 260 of the present invention. One or more molding processes are also used to mold a piston stop 250, a lower cone 260 and a stem 260. A spring 290 may be molded when using a plastic spring or acquired or purchased for use on the assembly line. Similarly, an accumulator inlet valve may be purchased or molded as desired depending on the type of accumulator inlet valve being used to manufacture the pump engine 200.

According to various embodiments, the molding of the piston stem 240 parts includes the molding of piston stem 240 components having at least one stem flange 249 extending off an exterior surface thereof. In other embodiments, the molding of the stem 240 parts includes the molding of piston stem 240 components having at least one stem channel in an exterior surface of the piston stem 240.

The molding of the lower cone 260 according to embodiments of the invention includes the molding of one or more lower cone channels 269 in an interior surface or interior of the lower cone 260. The one or more lower cone channels 269 may have different depths through the lower cone 260 and are configured to accept the and direct movement of a stem flange 249 in at least one lower cone channel 269 during operation of a pump engine 200. In other embodiments where a piston stem 240 includes one or more stem channels, the lower cone 260 may include a lower cone flange configured to seat in one of the stem channels.

Once the components are molded or obtained, the parts may be assembled into a pump engine 200. In some embodiments, an accumulator 210 is selected based on the desired size or output of the pump engine 200. A corresponding piston 230 is also selected. A stem 240 is aligned relative to the lower cone 260 in a position to allow the stem flange 249 to engage the desired lower cone channel 269 upon assembly. The spring 290 may be set on an inverted piston stem 240 and the lower cone 260 assembled to the piston stem 240 with the stem flange 249 sliding into the lower cone channel 269. The piston 230 may be assembled to the piston stop 250 and the piston stop 250 and piston 230 assembly inserted into the inverted piston stem 240 until the piston stop 250 is assembled therewith. The accumulator 210 may be assembled with the accumulator inlet valve and then inverted and snapped or assembled to the lower cone 260 portion of the piston stem 240, spring 290, lower cone 260, piston stop 25, and piston 230 assembly. The pump engine 200 is thus assembled.

An assembled pump engine 200 may be further assembled with a closure 130, a dip tube 140, and a dispensing head 120 to form a pump 110. The pump 110, in turn, may be assembled to a container 900 filled with a product 950, forming a dispensing system 100 according to embodiments of the invention.

According to embodiments of the invention, the components of the pump engine 200, the pump 110, the container 900, or the pump system 100 may all be made of a recyclable material and particularly, a recyclable plastic material. For example, in some embodiments of the invention, the pump engine 200 parts may be primarily formed of a polyethylene material. In other embodiments of the invention, a polypropylene material may be used. In still other embodiments, a mono-material or multiple materials capable of being recycled in a single recycling stream may be used to for the pump engine 200, pump 110, container 900, or pump system 100 of the present invention.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A pump engine, comprising:

an accumulator;

an accumulator inlet valve seated in the accumulator;

a lower cone attached to the accumulator, comprising:

a second spring cone; and nine lower cone channels, wherein three channels have a first length, three channels have as second length, and three channels have a third length;

a piston stem extending into a portion of the lower cone, comprising:

a first spring cone; and at least one stem flange seated in at least one lower cone channel;

a piston stop connected to the piston stem;

a piston connected to the piston stop; and a spring seated between the first spring cone and the second spring cone.

2. The pump engine of claim 1, wherein the accumulator inlet valve comprises a spider valve.

3. The pump engine of claim 1, wherein the accumulator inlet valve comprises a ball valve.

4. The pump engine of claim 1, further comprising a stroke space between the at least one stem flange and a bottom of a lower cone channel in which the at least one stem flange is seated, wherein the stroke space is different based on the length of the lower cone channels the at least one stem flange is seated.

5. The pump engine of claim 1, wherein the three channels having a first length are arranged 120 degrees from each other and the three channels having a second length are arranged 120 degrees from each other and the three channels having a third length are arranged 120 degrees from each other.

6. The pump engine of claim 1, wherein the at least one stem flange comprises three stem flanges arranged 120 degrees from each other.

7. The pump engine of claim 6, further comprising a stroke space defined by the distance between a bottom of the three stem flanges and the bottom of the three channels in which the three stem flanges are seated.

8. The pump engine of claim 1, wherein the spring comprises a plastic compression spring.

9. The pump engine of claim 1, wherein
the pump engine has a first stroke length when the stem flange is seated in the channels having a first length, a second stroke length when the stem flange is seated in channels having a second length, and a third stroke length when the stem flange is seated in the channels having a third length.

10. The pump engine of claim 1, wherein
a stroke length of the pump engine is determined by the channel into which the at least one stem flange is seated.

11. A pump system, comprising:
a container;
a product in the container;
a pump attached to the container, comprising:
a pump engine, comprising:
an accumulator;
an accumulator inlet valve seated in the accumulator;
a lower cone attached to the accumulator, comprising:
a second spring cone; and
nine lower cone channels, wherein three channels have a first length, three channels have as second length, and three channels have a third length;
a piston stem extending into a portion of the lower cone, comprising:
a first spring cone; and
at least one stem flange seated in at least one lower cone channel;
a piston stop connected to the piston stem;
a piston connected to the piston stop; and
a spring seated between the first spring cone and the second spring cone;
a closure fixing the pump engine to the container; and
a dispensing head attached to the pump engine.

12. The pump system of claim 11, wherein the pump is an atmospheric pump.

13. The pump system of claim 11, wherein the pump is an airless pump and the pump system further comprises a follower piston seated in the container such that the product is positioned between the follower piston and the pump engine.

14. The pump system of claim 11, wherein
the pump engine has a first stroke length when the stem flange is seated in the channels having a first length, a second stroke length when the stem flange is seated in channels having a second length, and a third stroke length when the stem flange is seated in the channels having a third length.

15. A method of producing a pump engine, comprising:
molding an accumulator;
molding a lower cone, comprising nine lower cone channels, wherein three channels have a first length, three channels have as second length, and three channels have a third length;
molding a piston stem comprising at least one stem flange;
molding a spring;
molding a piston stop;
molding a piston;
providing an inlet valve;
positioning the stem;
assembling the spring over the stem;
assembling the lower cone onto the stem, wherein the spring is positioned between the stem and the lower cone;
assembling piston to the piston stop;
assembling the piston stop to the stem; and
assembling the accumulator to the lower cone.

16. The method of claim 15, wherein molding a piston stem comprises molding a piston stem comprising a first spring cone and wherein molding a lower cone comprises molding a lower cone comprising a second spring cone, wherein the spring applies a force to the first spring cone and the second spring cone in an assembled state.

17. The method of claim 15, wherein each of the accumulator, lower cone, piston stem, piston stop, piston, and spring are molded of a recyclable plastic material.

* * * * *